United States Patent [19]

Wagle et al.

[11] 4,408,955
[45] Oct. 11, 1983

[54] WIND OPERATED WHEEL

[76] Inventors: Joseph A. Wagle; Joseph H. Wagle, both of Indianapolis, Ind. 46278

[21] Appl. No.: 160,672

[22] Filed: Jun. 18, 1980

[51] Int. Cl.$^3$ .............................................. F03D 7/06
[52] U.S. Cl. .................................... 416/119; 416/240; 416/132 B
[58] Field of Search ................ 416/119, 240 A, 132 B

[56] References Cited

U.S. PATENT DOCUMENTS

| 622,115 | 3/1899 | Carlson . | |
|---|---|---|---|
| 1,074,011 | 9/1913 | Partain | 416/119 X |
| 1,115,313 | 10/1914 | Henning | 416/119 |
| 1,511,965 | 10/1924 | Hennigh . | |
| 1,534,634 | 4/1925 | Correll . | |
| 1,626,313 | 4/1927 | Tuckey | 416/119 X |
| 1,917,655 | 7/1933 | Leash | 416/119 X |
| 1,928,449 | 9/1933 | Fugman . | |
| 2,030,769 | 2/1936 | Slattengren . | |
| 2,034,813 | 3/1936 | Holland . | |
| 3,153,292 | 10/1964 | Glascow . | |
| 3,638,341 | 2/1972 | Holmes . | |
| 3,786,583 | 1/1974 | Revor . | |
| 3,920,354 | 11/1975 | Decker | 416/117 |
| 3,995,170 | 11/1976 | Graybill | 416/240 A X |
| 4,049,362 | 9/1977 | Rineer | 416/240 A X |
| 4,218,183 | 8/1980 | Dall-Winther | 416/119 X |
| 4,248,568 | 2/1981 | Lechner | 416/240 A X |
| 4,346,305 | 8/1982 | White | 416/119 X |

FOREIGN PATENT DOCUMENTS

| 2218778 | 9/1974 | France | 416/119 |
|---|---|---|---|
| 2252769 | 6/1975 | France | 416/196 A |
| 2002064 | 2/1979 | United Kingdom | 416/119 |

Primary Examiner—Everette A. Powell, Jr.
Attorney, Agent, or Firm—Woodard, Weikart, Emhardt & Naughton

[57] ABSTRACT

A multi-armed, wind-operated wheel is disclosed which can be mounted to a spindle post and has a vane swivel-mounted to each of the radial arms of the assembly. The vanes are arranged to apply wind force against high-void supported grids during a downwind portion of rotation of the arm around the axis, and swing away from the grids to alignment with wind direction during the upwind sector of rotation of the arm and movement of the vane. A wire nut mounting of the wheel to a hanger wire, in lieu of post mounting, is also disclosed.

2 Claims, 13 Drawing Figures 4,408,955

WIND OPERATED WHEEL

BACKGROUND OF THE INVENTION

1. Field of the Invention

This invention relates generally to wind operated devices such as windmills or turbines, but more particularly to a device rotatable on a vertical axis in response to the wind, and susceptible to construction is very small or very large sizes for decorative or utilitarian purposes.

2. Description of the Prior Art

The most pertinent prior art of which we are aware is a wind rotor of the type shown in FIGS. 1-4 of our co-pending application for design patent, Ser. No. 25,984 filed Apr. 2, 1979. FIGS. 1-4 of that application show a simple structure wherein very light vanes in the form of pans are pivotally mounted on wire arms of special shape projecting radially outward from a tubular support. It is desirable to provide some of the same effects as were achieved with our prior art unit, but having capabilities for utilization in very small or large sizes for applications from purely decorative to very utilitarian, including power production. The present invention has resulted.

SUMMARY

Described briefly, according to a typical embodiment of the present invention, hub means are provided for rotation on a vertical axis and have arm means projecting radially outward therefrom to provide support for vanes. Vanes are pivotally mounted at outboard locations on the arm means and pivotable to and from positions engaging stops, during rotation of the unit about the axis, to thereby utilize the force from the wind during a downwind sector of rotation, but provide essentialy no wind resistance to movement in the upwind sector. For this purpose, the stop has a very low material area, but a large projected area, to provide support at a substantial number of points to enable utilization of somewhat flexible vane material.

DESCRIPTION OF THE PREFERRED EMBODIMENT

Figure 1:
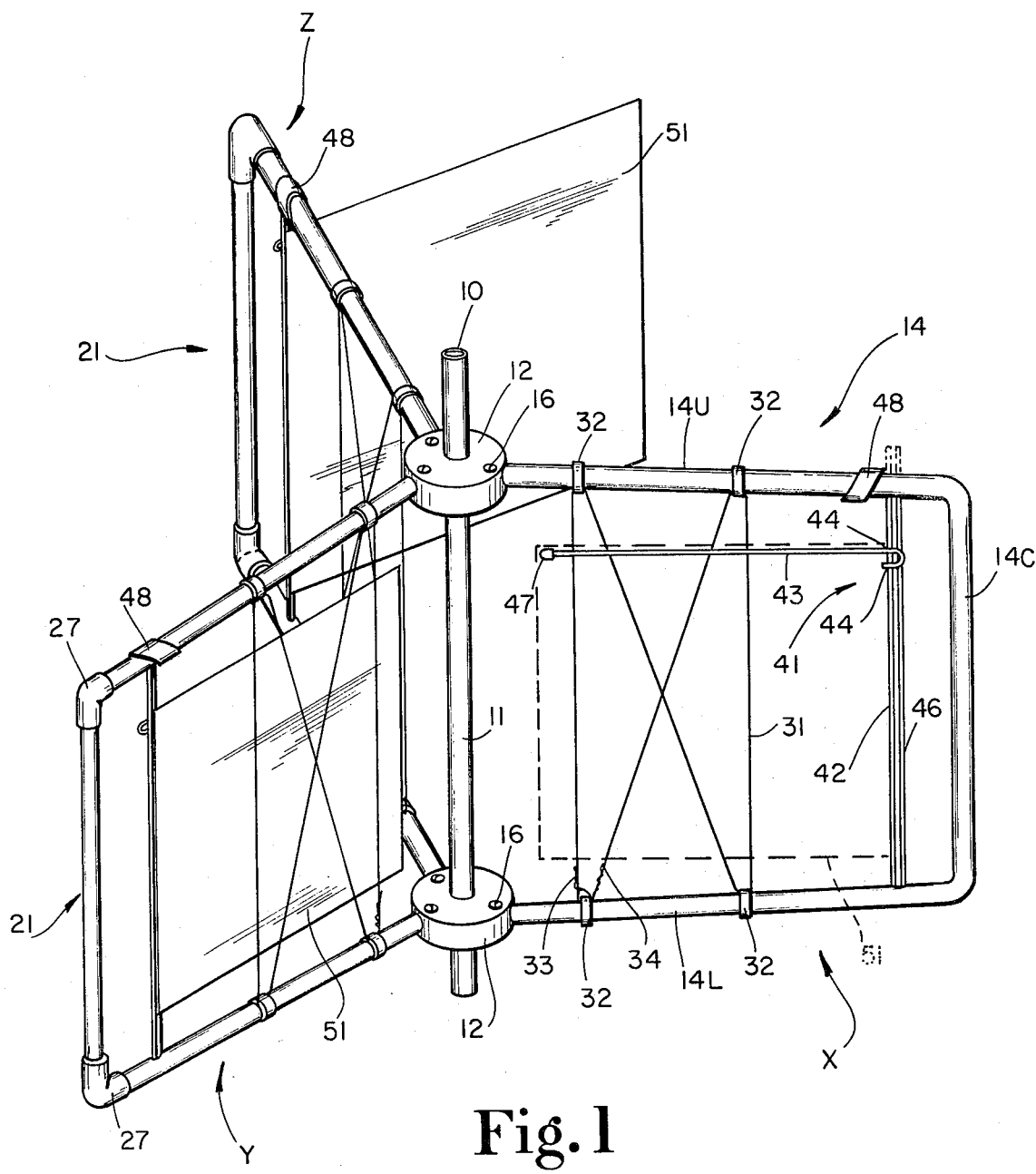
FIG. 1 is an isometric view of a wind operated wheel according to one embodiment of the present invention.
Figure 2:
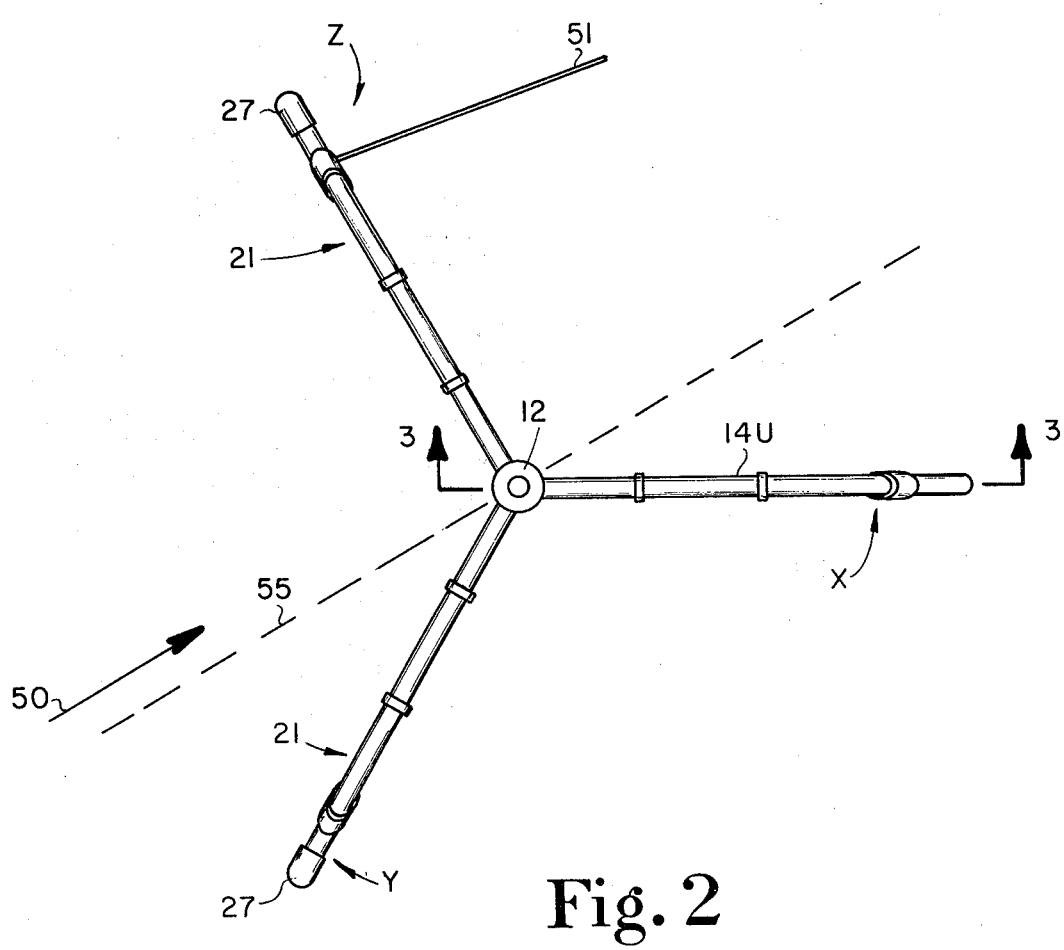
FIG. 2 is a top plan view thereof.
Figure 3:
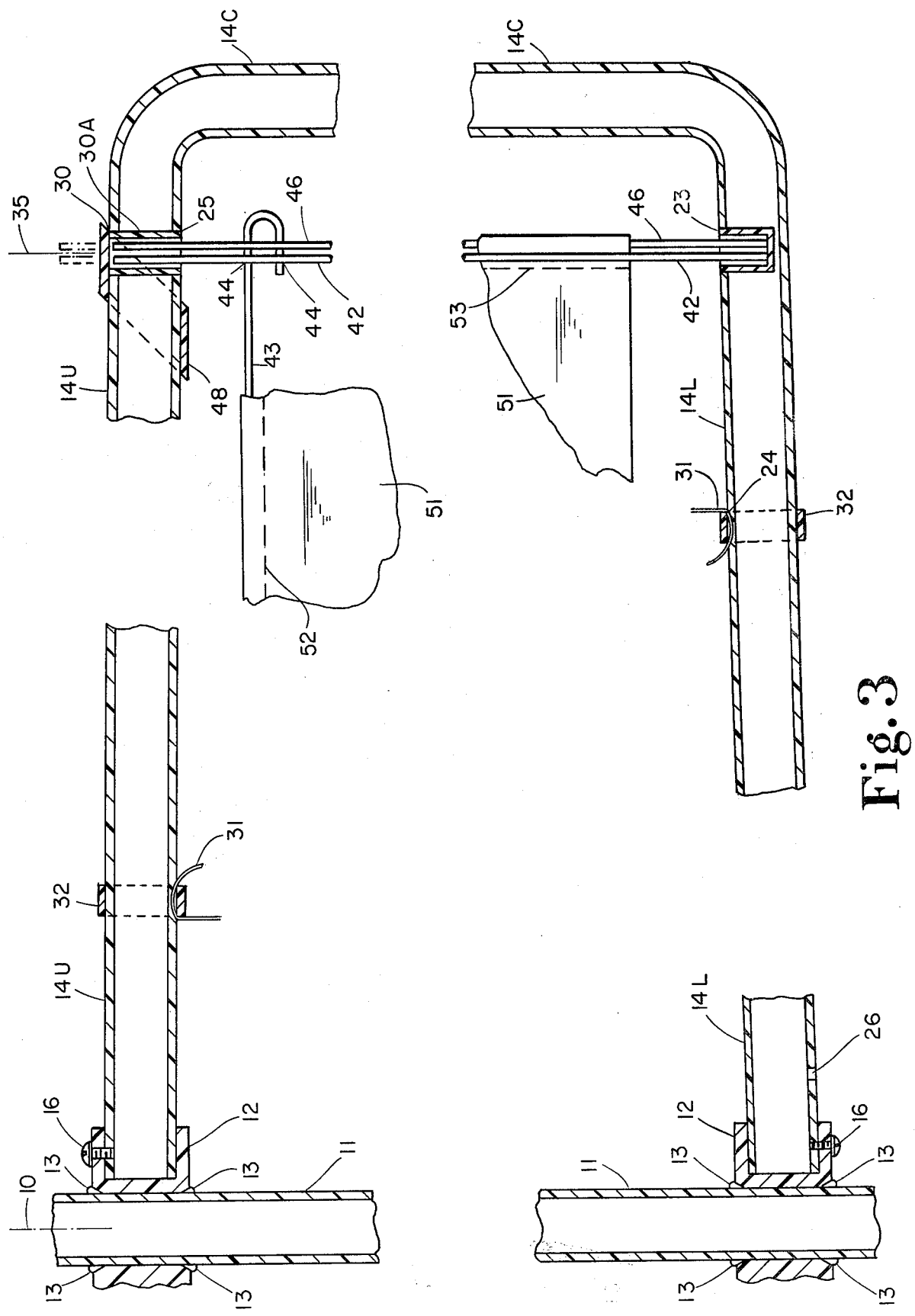
FIG. 3 is a fragmentary section therethrough taking at line 3—3 in FIG. 2 and viewed in the direction of the arrows.

Referring now to the drawings in detail, and particularly FIGS. 1, 2 and 3 thereof, a three-armed configuration is shown. This includes a hub assembly having a vertical hub tube 11, with upper and lower hub discs 12 secured thereto. In one example, the tubular portions of the hub assembly and arm frames can be made of polyvinylchloride (PVC) tubing of the type used for plumbing purposes. The hub discs 12 are secured to the tube 11 by adhesive as better shown at 13 in FIG. 3.

There are three radially extending frame portions, "X", "Y" and "Z", one (X) of which is shown at 14 as an integral U-shaped tube projecting radially from the upper and lower hub discs, with the upper and lower arms 14U and 14L, respectively, secured in sockets in the hub discs by screws 16. The outer ends of the arm portions 14U and 14L are joined by the column portion 14C. These arm and column portions cooperate with the supporting hub tube 11 to provide a frame. The same general configuration is shown for the other two arm frame portions 21 (Y and Z) but, in those instances, the tubular arms are joined to the tubular columns by tube fitting elbows 27.

As best shown in FIG. 3, a socket 23 is provided in arm 14L and a groove 24 is also provided in arm 14L. There are two such grooves in the top surface of each of the lower arms and in the lower surface of each of the upper arms. A drain hole 26 is provided in the lower arm 14L near the hub, and the same is done for each of the lower arms of the other two frames 21. It should be noted that the upper arm 14U slopes slightly downward as it extends outward from hub disc 12, and lower arm 14L extends on a downward slope from the column 14C to the lower arm disc 12. Accordingly, any water which may enter the arm frame can find an exit at the aperture 26.

The socket 23 received in a hole in the top of the lower arm 14L has already been mentioned. It is secured in that hole and may rest on the lower wall of the arm. The upper arm has a pair of holes therein, 25 in the underside and 30 in the top side of the arm 14U. These receive a bushing 30A. The bushing and socket are both cylindrical and have a common cylindrical axis 35. This axis is parallel to the wheel rotation axis 10 which is collinear with the axis of the hub assembly 11-12.

A lacing wire 31 is strung in the manner shown in FIG. 1 and is received in the above-mentioned grooves in the top and bottom of the lower and upper arms 14L and 14U, respectively. Wire retainer rings 32 made of plastic, are snugly received on the tubes and, since the diameter of the wire 31 is slightly greater than the entrance aperture between the rings 32 and the grooves 24, these rings will secure the wire from movement longitudinally along the arms. After lacing the wire in the unit from the lower inboard retainer ring groove to the upper inboard groove, then down to the lower outboard groove and up to the upper outboard groove, and then back to the starting point, the wire may be twisted together, as shown. It therefore provides a relatively soft but sturdy wide area stop having essentially no resistance to the wind as the wheel rotates about axis 10. If desired, the wire can be started by looping it around the retainer ring at the lower inboard groove and twisting it at 33. Then, the opposite end, when it is returned to this particular ring, can be looped around the ring and twisted as at 34. This provides a stop which is substantially co-planar with a plane containing the axis 10 and the axis 35 through bushing 30A and socket 23.

Support wire assembly 41 is provided and includes vertical support wire 42 received at the bottom in socket 23 and at the top in bushing 30A, and horizontal support wire 43 having a small loop at the end of it welded to the vertical support wire 42 at points 44. Another vertical support wire 46 is parallel and closely spaced to wire 42. An anti-wear cap 47 is provided at the distal end of horizontal support wire 43. A scarfed sleeve 48 of plastic material snugly received on the upper arm 14U can be pushed over the upper aperture 30 and bushing 30A to cover it and thereby prevent movement of the vertical support wires 42 and 46 upward from the position shown in FIG. 3.

Figure 4:
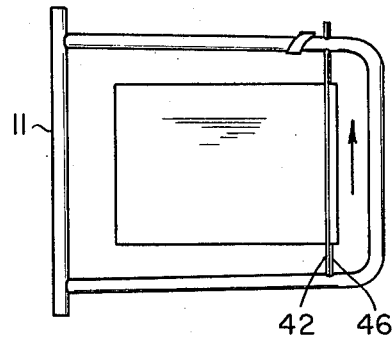
FIGS. 4, 5, and 6 show one of the arm frames of the typical embodiment, and the three steps in the procedure of mounting a vane into the frame according to the typical embodiment of the invention.
Figure 5:
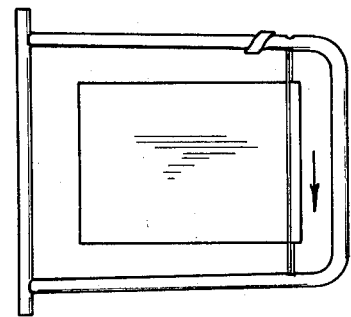
Figure 6:
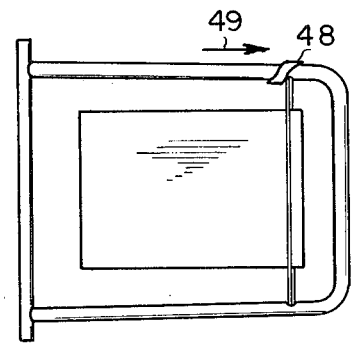

Three vanes in the form of flags 51 are provided in this embodiment illustrated in FIGS. 1, 2 and 3. The flag on the arm frame 14 is shown in dotted lines in order to facilitate the showing of the horizontal support wire 43 and the vane stop wire lace. The flag may be a fabric flag hemmed at the top 52 and along one side edge 53 to provide sleeves at those locations. Before assembly of the flag into the frame, the vertical support wire 46 is fed down through the sleeve 53, and the horizontal support wire 43 is fed through the horizontal sleeve 52. The support wire assembly is then mounted in the frame in the manner shown in FIG. 4 where the wires 42 and 46 are inserted upward through the bushing 30A to permit the lower ends of these wires to clear the top of the lower arm 14L and be aligned with socket 23. Then the lower ends are inserted in the socket 23 as shown in FIG. 5 where they rest on the bottom of the socket as shown in FIG. 3. Then, the scarfed ring 48 is moved from the position shown in FIG. 1 and FIGS. 4 and 5, outward in the direction of arrow 49 to the position shown in FIG. 6, where it retains the wires in the operational position shown in FIG. 3, where they can pivot on the arms about the vane axis 35. This pivotal motion can be from the position shown for arms X and Y in FIGS. 1 and 2, through the position shown for arm Z in those figures.

Where the flags are positioned against the stop wire lace, they are essentially co-planar with the planes containing the axes of the respective vane pivots and the rotational axis 10 of the wheel assembly. This can be referred to as a closed position. They can swing out from this position during operation of the wheel by a wind force. For example, where the wind is moving in the direction of the arrow 50 in FIG. 5, it will be seen that the vanes are engaged with (seated against) the stop webbs or grids until the arm has swung around to the point where the wind entering the wheel in the direction 50 no longer forces the vane against the stop, whereupon the vane can then swing out about the vane pivot axis 35 and continue around until it is in line with the wind as the vane 51 on arm Z is shown parallel to the wind direction 50. It will maintain this attitude until it has moved around from the upwind sector of rotation (above line 55 in FIG. 2) and then, when the arm passes the line 55, the wind closes the vane against the stop and it remains in that position until it has moved again around the downwind sector of travel below the line 55. Although centrifugal force might tend to throw the vane out beyond a direction parallel to the wind direction, its minimal weight, usually being a fabric, with the wire support, is such that the wind control is greater than the centrifugal force, thus tending to maintain zero resistance alignment of the vane with the wind direction during the upwind sensor of vane travel in rotation of the wheel.

Figure 7:
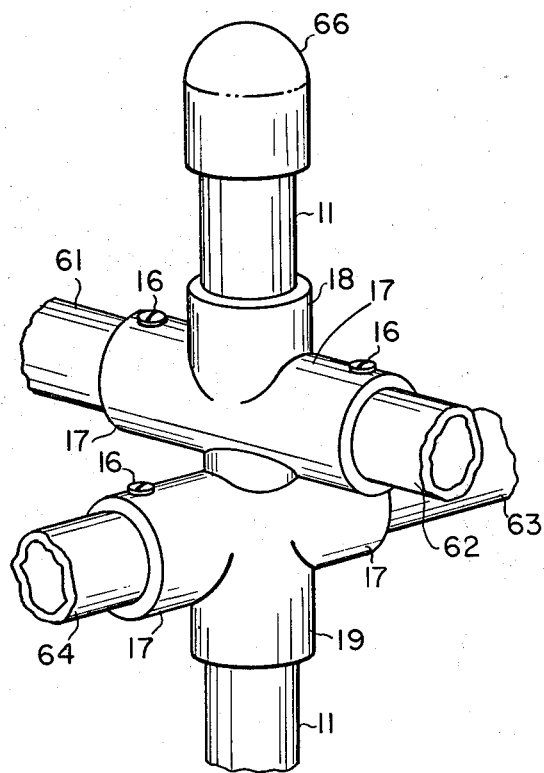
FIG. 7 is an enlarged fragmentary view of a hub assembly according to a second embodiment of the invention.
Figure 8:
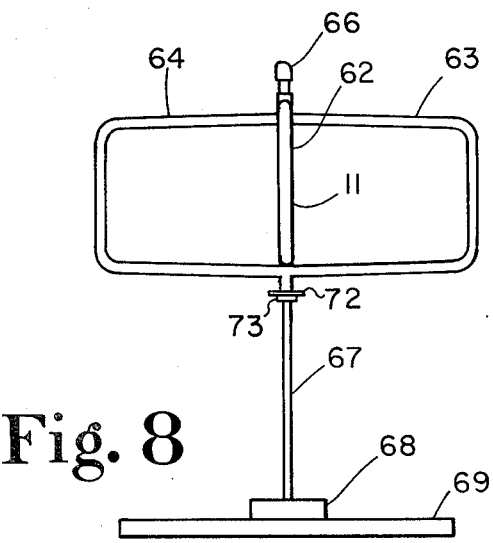
FIG. 8 is a small elevational view of the second embodiment mounted on a spindle post.
Figure 9:
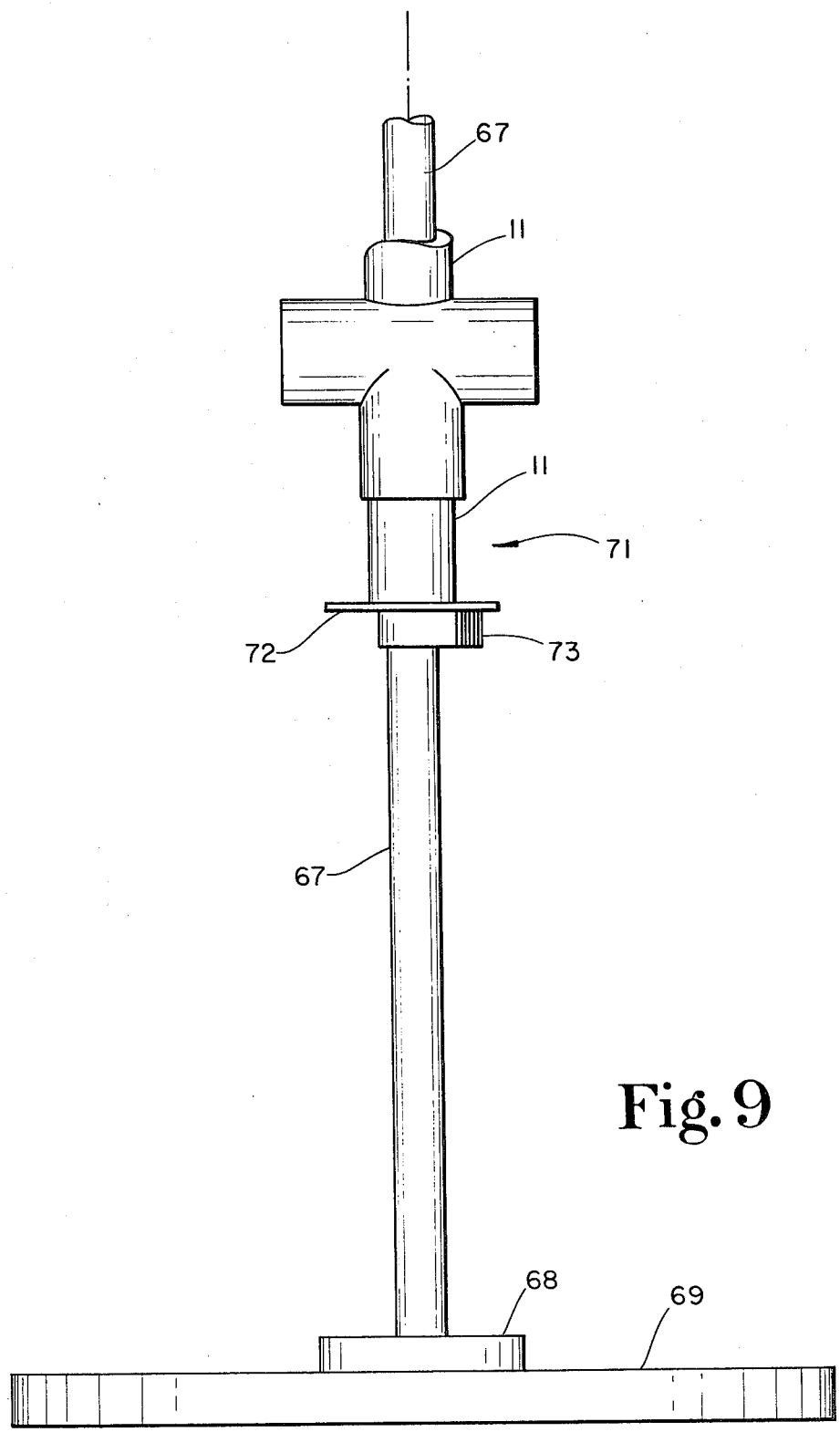
FIG. 9 is an enlarged fragment of FIG. 8 showing support details.

Referring now to FIG. 7, there is shown hub socket units on the hub tube 11 such as can be employed for a four frame version. For this purpose, the upper hub assembly is comprised of two T-shaped couplings or fittings of the type used for plumbing purposes, and which are stacked and adhesively secured to the hub tube 11. The arms of the unit are attached in the same way as the arms of the embodiment of FIGS. 1–3, using the screws 16 in the arm tube receiver sockets 17. The frames are disposed at 90° with respect to each other as is best shown in the schematic top plan view of FIG. 11 which shows the top or upper arms 61, 62, 63 and 64 disposed at 90° with respect to each other. The frames are of the same general configuration as shown in FIGS. 1 and 3, and the lower arms thereof are connected in the same type of stacked T-fitting hub assembly near the lower end of tube 11. A top cap 66 is provided, covering the upper end of the tube 11. This assembly is mounted to a vertical post spindle 67 mounted in a socket 68 in a base 69. Details of this mounting are shown in FIG. 9 where the lower hub unit has its lower end received on a thrust washer 72 which is supported on the spindle by a clip 73. Where the post spindle 67 is made of wood or some similarly surfaced material, the clip 73 may be a hose clamp of a type marketed by the Tyton Corporation of Post Office Box 23055, Milwaukee, Wis. 53223, and referred to as the "The Snapper". For a ⅜ inch diameter post, the Tyton part No. SNP-2 may be used. When the unit has been thus mounted to the post 67, with the tube 11 providing a suitable radial bearing on the post, the unit is ready to operate whenever a wind arises. It should be noted upon reference to FIG. 8, that the shape of the frame for the four frame version, is essentially the same as that for the three frame version, having a downward slope of the upper arm as it extends further outward, and a downward slope of the lower arm as it extends inward toward the hub.

Figure 10:
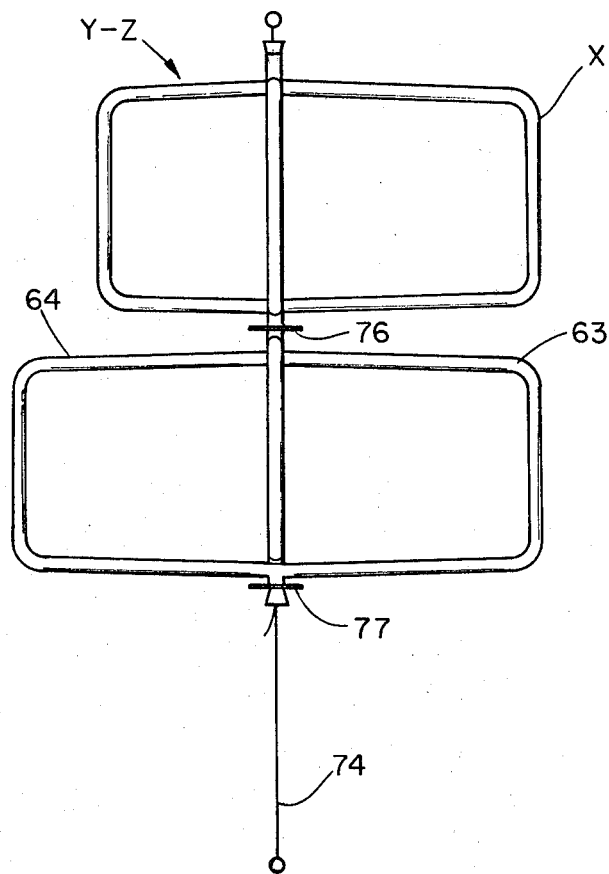
FIG. 10 is a small elevational view of the second embodiment mounted on a wire spindle, with one of the units according to the first embodiment mounted above it on the same spindle wire, in a stack arrangement.

Referring now to FIG. 10, there is shown a version which, instead of being mounted on a vertical post spindle, is mounted on a vertical wire spindle. In addition, instead of a single wheel, there are two stacked wheels. Still further, the upper wheel is a three frame version and the lower wheel is a four frame version. They are mounted on a vertical wire spindle 74 and the upper wheel is supported on a thrust washer 76 which is, in-turn, supported on the central tube of the lower wheel which is supported on thrust washer 77, these thrust washers being similar to washer 72 of FIG. 9.

Figure 12:
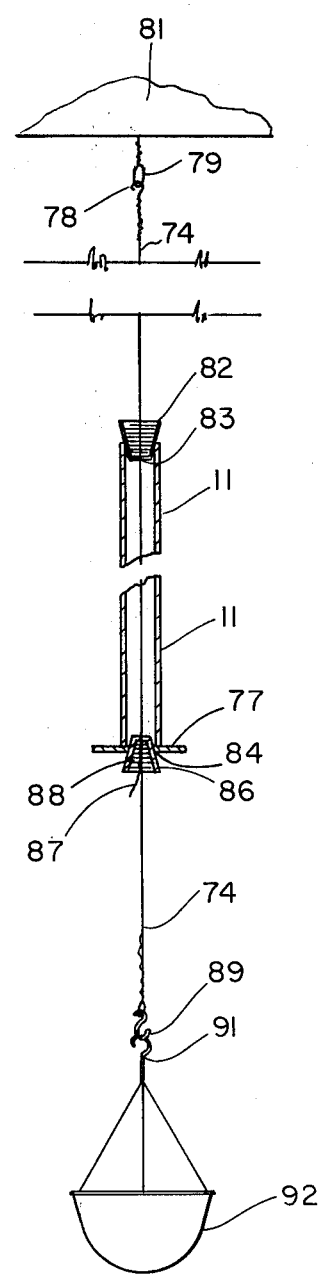
FIG. 12 is a further detailed view of the mounting of FIG. 10.

Referring to FIG. 12, which shows more detail of this type of mounting, the upper end of wire 74 has a hook 78 thereon received in a screw eye or the like 79 secured to an upper support member 81 which can be a part of some building structure, a tree limb, or the like. A wire nut 82 of the type commonly used for securing electrical wire ends together, is altered in the respect that it has a central aperture 83 in the end thereof to receive wire 74 through it. This nut 82 is received in the upper end of the hub tube 11 to serve as an upper radial bearing. Thrust washer 77 has an aperture 84 therein receiving the upper end of another wire nut 86, which is altered in the same way as the wire nut 82. The aperture 84 is small enough that the wire nut 86 cannot be snugly engaged in the lower end of hub tube 11. Therefore, the nut 86 does not interefere with support of the tube 11 by the thrust washer 77, and does not interfere with the rotation of the tube. The upper end of the wire nut which projects immediately above the thrust washer is used to pilot the inside of tube 11 on it, and thus serves as the lower radial bearing for the tube. The location of nut 86 is affixed to the tether wire 74 by a short stub wire 87, which is pushed up into the locking spring 88 in the wire nut, whereupon the nut is twisted on the two wires to thereby affix the wires together and establish the longitudinal location of the nut 86 on the wire 74.

A hook 89 is secured to the lower end of wire 74 and can receive a hook 91 of a planter bucket 92 filled with dirt to provide the desired degree of tension in wire 74. This is preferably from two to five pounds and should be within limits of one to ten pounds. In the practice of the invention, the apertures such as 83 in the wire nuts 82 and 86 should be slightly larger than the diameter of wire 74 so as to permit free passage of the wire through them, but small enough to also serve to pilot the nuts on the wire. The nuts 82 and 86 can be used for each frame in a stack, or at the top and bottom of the stack of frames, with suitable thrust and radial load accommodations such thrust washers between frames, and piloting wire nuts, if desired.

Figure 11:
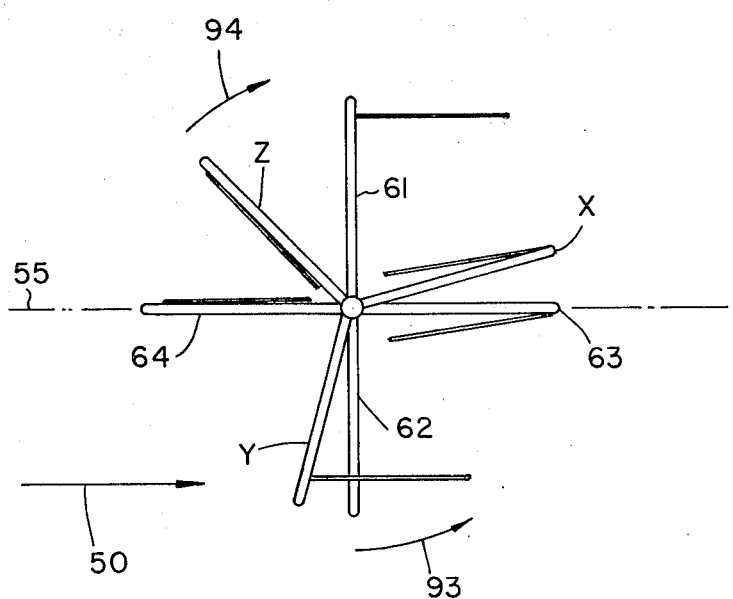
FIG. 11 is a top view of the stacked arrangement.

Referring further to FIG. 11, which is a top view of the stacked arrangement of the two wheels, it should be noted that the same reference numerals are used as are used in FIG. 2 to represent wind direction and a plane parallel to wind direction and containing the rotational axis of the wheel array. Also, it should be noted that the wheels are arranged so that the four frame wheel rotates counterclockwise in the direction of arrow 93, while the three frame wheel rotates in the clockwise direction of arrow 94. For this purpose, the vanes on the lower, four frame wheel are located on the same side of the vane seat grid as is shown in FIG. 1. However, for the three frame wheel, the vanes are mounted for engagement with the opposite faces of the vane seat grids. This will enable them to apply force to the arms for rotational torque in the clockwise direction, in contrast to the situation for the lower wheel where the force will be applied to the grid in a direction of rotational torque in the counterclockwise direction. The facility with which the vane support pivot posts can be removed and reinstalled from the sockets makes it easy to remove the vanes or flags from the frames and resinstal them so that the flags will be on the opposite face of the grids when at rest.

From the foregoing description, it should be recognized that the present invention is best implemented by using materials having minimal weight, consistent with adequate strength and durability for the rotating portions, particularly the vanes and vane support members. The minimum weight vanes are preferably flexible and non self-supporting. Where the vanes are made of a film, a Mylar brand polyester film, of two to ten mil thickness, is desirable. Where flags are employed and made of cloth, polyester cloth has been found suitable in terms of weight and durability. Ten and twelve gauge galvanized zinc coated steel wire has been employed successfully for the horizontal and vertical vane support wires respectively. For the vane seat grid lacing, the lacing arrangement shown in FIG. 1 has been found suitable for six inch by nine inch flags, while the twelve inch by eighteen inch flags in a larger frame may require additional lacing, still of the generally X arrangement shown in FIG. 1, but also having an additional attachment point at each of the upper and lower arms to provide for adequate spacing of support of the flag longitudinally of the arms. By using the smallest wire consistent with handling and reasonable seating support for the swinging vanes when they enter the torque input portion (the downwind sector) of rotation, there will be minimal drag caused by the lacing as it moves in the drag portion (upwind sector) of rotation of the wheel. By using this wire grid arrangement, the percentage of the projected area of seat which is void of obstruction, can be 99%. For example, the projected area of available seating area for the lace grid of FIG. 1, is from the upper and lower arms 14U and 14L (as upper and lower margins) to the inner and outer vertical runs of the lacing wire 31 (as left-hand and right-hand margins). While not all of this area is necessarily used for the vane stop, depending on vane size, it is available, if needed. Nevertheless, the area of material is very small and the void area is extremely large, of the order of 99%. Therefore, the vane stop provides minimal wind resistence and very high void area, and yet provides a large available spread of contact points or lines engagable by the vane to thereby provide a wide area soft stop to which the vane transmits rotational torque when it is on the downwind sector of rotation of the wheel.

The provision of the button or cap 47 on the distal end of the horizontal support wire 43 enables threading the upper or top edge sleeve of the flag onto this wire without damage to the sleeve. Also, cap minimizes vane wear during normal fluttering movement and slight radial movement of vane when operating. It helps to preclude perforation of the closed end of the sleeve of especially thin or light weight vanes which otherwise might fold and unfold like drapes on a curtain rod 43 with each flap of the vane 51. It minimizes potential danger of support wire end to user and for observers. A similar type of cap or tip could be put on the vertical post 46, if desired, during the threading of the edge sleeve of the flag onto this wire, although it would need to be removed to provide adequate space for the wire in the upper bushing.

Figure 13:
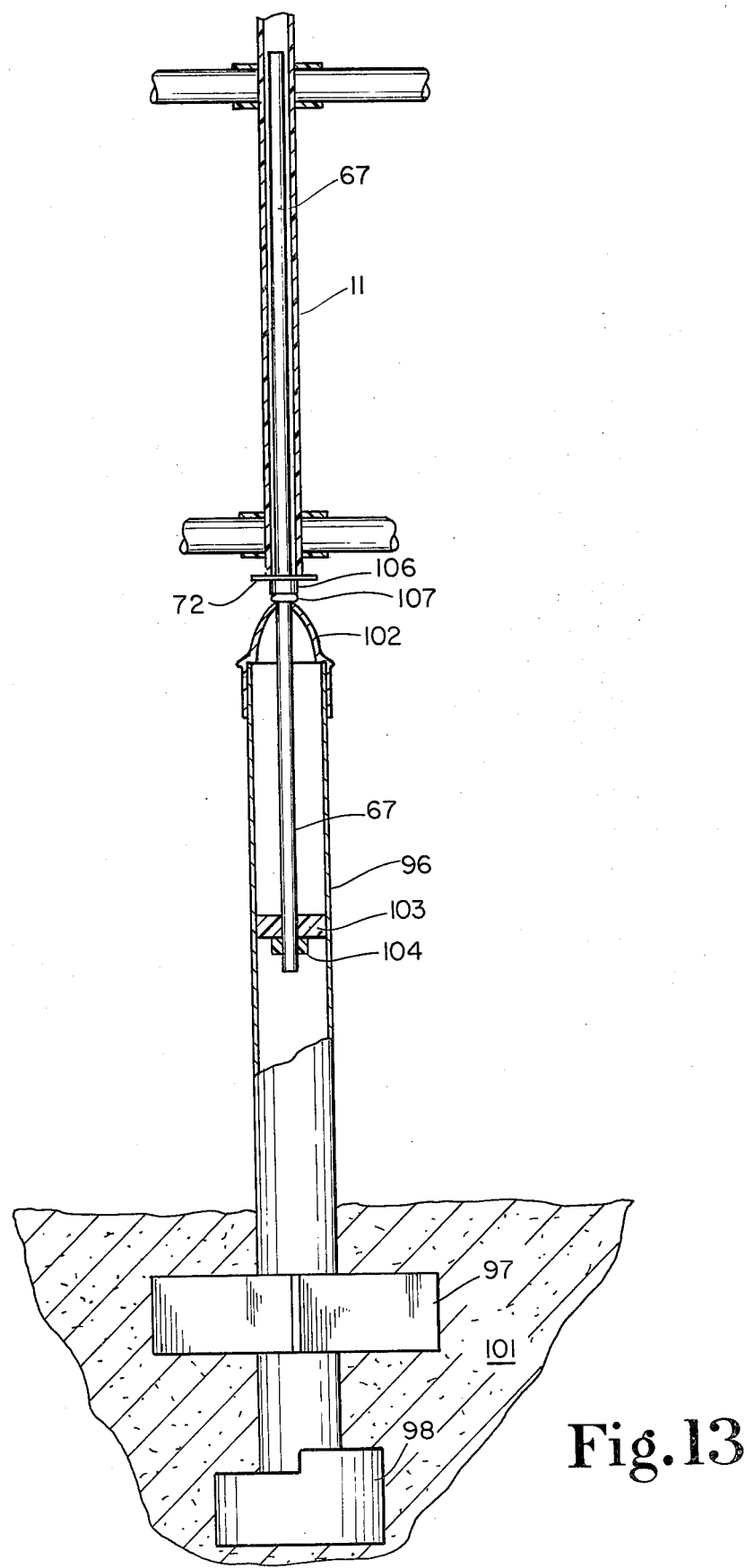
FIG. 13 shows a mounting arrangement suitable for a fencepost.

Referring now to FIG. 13, there is shown a mounting arrangement suitable for a fence post. In this illustration, a standard fence post 96 of 1 and $\frac{5}{8}$ inch diameter has standard anchors 97 and 98 in the ground 101. It has a standard cap 102 but which has been modified by drilling a hole in the top to fittingly receive the $\frac{3}{8}$ inch diameter spindle post such as 67, which was illustrated in FIG. 9. In this instance, however, the spindle rod 67 has a disc 103 near the lower end and which may be of wood or other suitable material supported on the post by the spring clamp 104. The spindle rod is vertically supported on the fence post cap by means of the spring clamp 106 clamped onto the rod 67 and resting on an elastic sealing ring or washer 107 resting on top of the cap 102. Thrust washer 72 is mounted on top of clamp 106 and the spindle tube 11 is supported on that in the same way as described above with reference to FIG. 9. The spindle rod 67 extends to near the upper end of the spindle tube 11 and thus provides the radial bearing for the tube 11 at both the upper and lower ends of the tube. The typical inside diameter of tube 11 is $\frac{1}{2}$ inch whereas the outside diameter of the spindle rod 67 is $\frac{3}{8}$ inch, thus providing a diametrical clearance between the two of $\frac{1}{8}$ inch.

For any chain link or other fence using a similar fence post, this mounting arrangement can be employed. The spring clips provide the vertical support for the spindle rods 67 and the lower disc 103 simply stabilizes the rod in the tube. Where the spindle rod 67 is plastic or metal or some slick-surface material, it may be advisable to wrap it with a tape of the "Vyton" brand or other suitable brand, to enable the clamp, which is usually made of nylon material, to serve its gripping and locating function. The thrust washer 72 is typically made of nylon.

It should be recognized that the vanes made according to this invention can be of fairly readily expendable material and can be easily changed for accommodation to differences in weather, seasons, color, themes, or advertising messages. The framework can be provided in a color or texture compatible with surroundings, or consistent with the intended use of the device. Additional wheels can be stacked on either the post type of spindle or wire type of spindle, and operable in the same or opposite rotational directions. The shape of the frames can be varied, if desired, for different appearance features. It is possible to have more than four flag frames per wheel, and it is possible to have more than one flag within a frame. For frames of great radius from the hub to the outer end, flag swivel spindles could be spaced along the length of the arms, with a flag and stop grid for each of the spindles, so long as there is room for all of the flags to fold to the seated position against their respective grids during the downwind sector of rotation of the wheel.

While the invention has been illustrated and described in detail in the drawings and foregoing description, the same is to be considered as illustrative and not restrictive in character, it being understood that only the preferred embodiments have been shown and described, and that all changes and modifications that come within the spirit of the invention are desired to be protected.

The invention claimed is:

1. A wind operated wheel comprising:
hub means rotatable on an axis;
a plurality of frame means projecting outward from said hub means;
vane mounting means in said frame means, said vane mounting means including vane pivot means, pivotally mounted in said frame means on pivot axes substantially parallel to and remote from said hub means axis;
vane stop means mounted in said frame means inboard from said pivot axes; and
flexible vane means secured to said vane mounting means and disposed within said frame means, said vane means being engageable with said stop means to drive the wheel in the direction of a wind when said vane means are on the upwind side of said vane stop means, and said vane means being pivotable away from said stop means as said frame means move said vane means to a position where said stop means are upwind of said vane means;
said stop means and pivot axis for the frame means lying in a plane containing the rotational axis for the wheel,
said stop means including a grid of wire lying in said plane,
said frame means including upper and lower radially extending arms and an outboard connector column;
said arms and column being tubular;
portions of said arms lying in said plane having superficial grooves therein facing the center of the area framed by said frame means;
said grid including a wire laced from grooves in the top arm to grooves in the lower arm, with sleeves encircling said arms and portions of said grooves and the laced wire in the grooves to retain said wire in said grooves.

2. A wind operated wheel comprising:
hub means rotatable on an axis;
a plurality of frame means projecting outward from said hub means;
vane mounting means in said frame means, said vane mounting means including vane pivot means, pivotally mounted in said frame means on pivot axes substantially parallel to and remote from said hub means axis;
vane stop means mounted in said frame means inboard from said pivot axes; and
flexible vane means secured to said vane mounting means and disposed within said frame means, said vane means being engageable with said stop means to drive the wheel in the direction of a wind when said vane means are on the upwind side of said vane stop means, and said vane means being pivotable away from said stop means as said frame means move said vane means to a position where said stop means are upwind of said vane means;
said stop means and pivot axis for the frame means lying in a plane containing the rotational axis for the wheel,
said hub means including a hub tube assembly;
said frame means including upper and lower tubular frame arms radially extending outward from said hub tube assembly, and generally tubular vertical columns joined to said arms at the outer ends thereof,
the vane pivot means including a first pivot post having a lower end received in a socket in one of said lower radially extending arms of said frame means and an upper end received in an aperture in one of said upper radially extending arms of said frame means, the socket and aperture providing the pivotal bearings for said vane pivot means, said vane being received on said post and vertically located thereby in said frame means;
said vane pivot means further include a second post in parallel closely-spaced relation to said first post and having a lower end received in said socket means and an upper end received in said aperture, and pivotable with said first post about the common axis of said socket and aperture,
said vane means include a flag, said flag having a vertically extending hem at one margin with said second post receiving said hem thereon, the second post extending parallel to the length of the hem and received therethrough to provide a mast for the flag,
said first post having a horizontal vane support arm extending therefrom and through a second hem at a top margin of said flag, whereby the flag is supported in a vertical direction from a point adjacent said posts to a point near the distal end of said arm,
said flags extending from pivot axes remote from the wheel rotational axis and adjacent said columns of the frame means, inward to points proximate the wheel rotational axis when the flags are engaged against said stop means, said posts and vane support arms being wire, the horizontal vane support arms being affixed to said first post wires, said posts extending up into the apertures in the upper arms to points near the top of the apertures but within the cross sectional areas of said upper arms, and scarf retainer sleeves encircling said upper arms and secure thereon and covering the tops of the apertures but having an inclined marginal edge to leave the bottoms of the apertures uncovered, whereby said posts are precluded from upward travel out of said apertures but pivoting thereof on the vane pivot axes is accommodated.

* * * * *